United States Patent
Nakashima (10) Patent No.: US 11,954,001 B2
(45) Date of Patent: Apr. 9, 2024

(54) STORAGE SYSTEM

(71) Applicant: Hitachi, Ltd., Tokyo (JP)

(72) Inventor: Issei Nakashima, Tokyo (JP)

(73) Assignee: Hitachi, Ltd., Tokyo (JP)

(*) Notice: Subject to any disclaimer, the term of this patent is extended or adjusted under 35 U.S.C. 154(b) by 96 days.

(21) Appl. No.: 17/688,537

(22) Filed: Mar. 7, 2022

(65) Prior Publication Data

US 2023/0168980 A1 Jun. 1, 2023

(30) Foreign Application Priority Data

Dec. 1, 2021 (JP) ................. 2021-195318

(51) Int. Cl.
*G06F 11/00* (2006.01)
*G06F 11/07* (2006.01)
*G06F 11/20* (2006.01)
*G06F 11/30* (2006.01)
*G06F 13/42* (2006.01)

(52) U.S. Cl.
CPC ...... *G06F 11/2069* (2013.01); *G06F 11/0757* (2013.01); *G06F 11/3027* (2013.01); *G06F 11/3034* (2013.01); *G06F 13/4221* (2013.01); *G06F 13/4282* (2013.01)

(58) Field of Classification Search
CPC ............. G06F 11/2069; G06F 11/0757; G06F 11/3027; G06F 11/3034; G06F 11/0736; G06F 11/0745; G06F 11/1441; G06F 13/4221; G06F 13/4282
See application file for complete search history.

(56) References Cited

U.S. PATENT DOCUMENTS

| | | | |
|---|---|---|---|
| 6,728,908 B1 * | 4/2004 | Fukuhara | H04L 1/0061 714/48 |
| 10,067,834 B1 * | 9/2018 | Montero | G06F 11/1417 |
| 2004/0255193 A1 * | 12/2004 | Larson | G06F 13/4291 714/E11.201 |
| 2006/0242348 A1 * | 10/2006 | Humphrey | G06F 13/4291 710/305 |

(Continued)

FOREIGN PATENT DOCUMENTS

JP 2018-116679 A 7/2018

*Primary Examiner* — Joseph D Manoskey
(74) *Attorney, Agent, or Firm* — Procopio, Cory, Hargreaves & Savitch LLP (57) ABSTRACT

A storage system includes: a power source; a drive box that stores a storage apparatus; a storing apparatus having a storage unit in which data regarding devices is stored; a PCIe switch that can switch between a plurality of communication paths, has a communication path connected at least to the storage apparatus, and can further perform I2C communication with the storing apparatus; an auxiliary apparatus that can perform I2C communication with the PCIe switch; and a MOS switch that controls power supply from the power source to the storing apparatus, wherein if timeout of the I2C communication between the PCIe switch and the storing apparatus occurs, the PCIe switch transmits a hard reset command to the auxiliary apparatus; and wherein when the auxiliary apparatus receives the hard reset command, the auxiliary apparatus stops the power supply to the storing apparatus by using the MOS switch and then performs power resupply.

7 Claims, 5 Drawing Sheets

(56) References Cited

U.S. PATENT DOCUMENTS

| | | | |
|---|---|---|---|
| 2011/0231674 A1* | 9/2011 | Stuhlsatz | G11B 19/2054 714/E11.062 |
| 2018/0203779 A1 | 7/2018 | Huang et al. | |
| 2020/0133805 A1* | 4/2020 | Bisa | G06F 11/349 |
| 2022/0003817 A1* | 1/2022 | Khatri | G06F 21/572 |
| 2022/0283976 A1* | 9/2022 | Long | G06F 1/189 |

* cited by examiner

| STATUS MANAGEMENT TABLE | | | |
|---|---|---|---|
| DEVICE ID | STATUS | SOFT RESET FLAG | HARD RESET FLAG |
| 1 | NORMAL | OFF | OFF |
| 2 | NORMAL | ON | OFF |

311

STORAGE SYSTEM

BACKGROUND OF THE INVENTION

1. Field of the Invention

The present invention relates to a storage system.

2. Description of the Related Art

In order to shorten downtime of a storage system, it is desirable to have a configuration that is automatically restored when a problem occurs. Japanese Patent Application Laid-Open Publication No. 2018-116679 discloses a method for monitoring an I2C bus status using a substrate management controller and a hardware watch dog circuit, wherein the I2C bus status monitoring method includes: a detection step of detecting invalidation of an I2C bus by using the HW circuit; a judgment step of judging whether or not the HW circuit can automatically reset a plurality of I2C devices on the I2C bus; a step of resetting the plurality of I2C devices by using the HW circuit if it is determined that the HW circuit can automatically reset the I2C devices on the I2C bus; and a processing step of reporting the detected invalidation to the BMC by using the HW circuit and processing the detected invalidation by using the BMC if it is determined that the HW circuit cannot automatically reset the I2C devices on the I2C bus.

SUMMARY OF THE INVENTION

The invention described in the Japanese Patent Application Laid-Open Publication No. 2018-116679 has room for improvement of the reset method.

A storage system according to a first aspect of the present invention includes: a power source; a drive box that stores a storage apparatus; a storing apparatus having a storage unit in which data regarding devices is stored; a PCIe switch that can switch between a plurality of communication paths, has a communication path connected at least to the storage apparatus, and can further perform I2C communication with the storing apparatus; an auxiliary apparatus that can perform I2C communication with the PCIe switch; and a MOS switch that controls power supply from the power source to the storing apparatus, wherein if timeout of the I2C communication between the PCIe switch and the storing apparatus occurs, the PCIe switch transmits a hard reset command to the auxiliary apparatus; and wherein when the auxiliary apparatus receives the hard reset command, the auxiliary apparatus stops the power supply to the storing apparatus by using the MOS switch and then performs power resupply.

Advantageous Effects of the Invention

According to the present invention, the hard reset of the I2C device which does not have a reset switch can be performed.

DESCRIPTION OF EMBODIMENTS

First Embodiment

A first embodiment of a storage system according to the present invention will be explained below with reference to FIG. 1 to FIG. 5.

Figure 1:
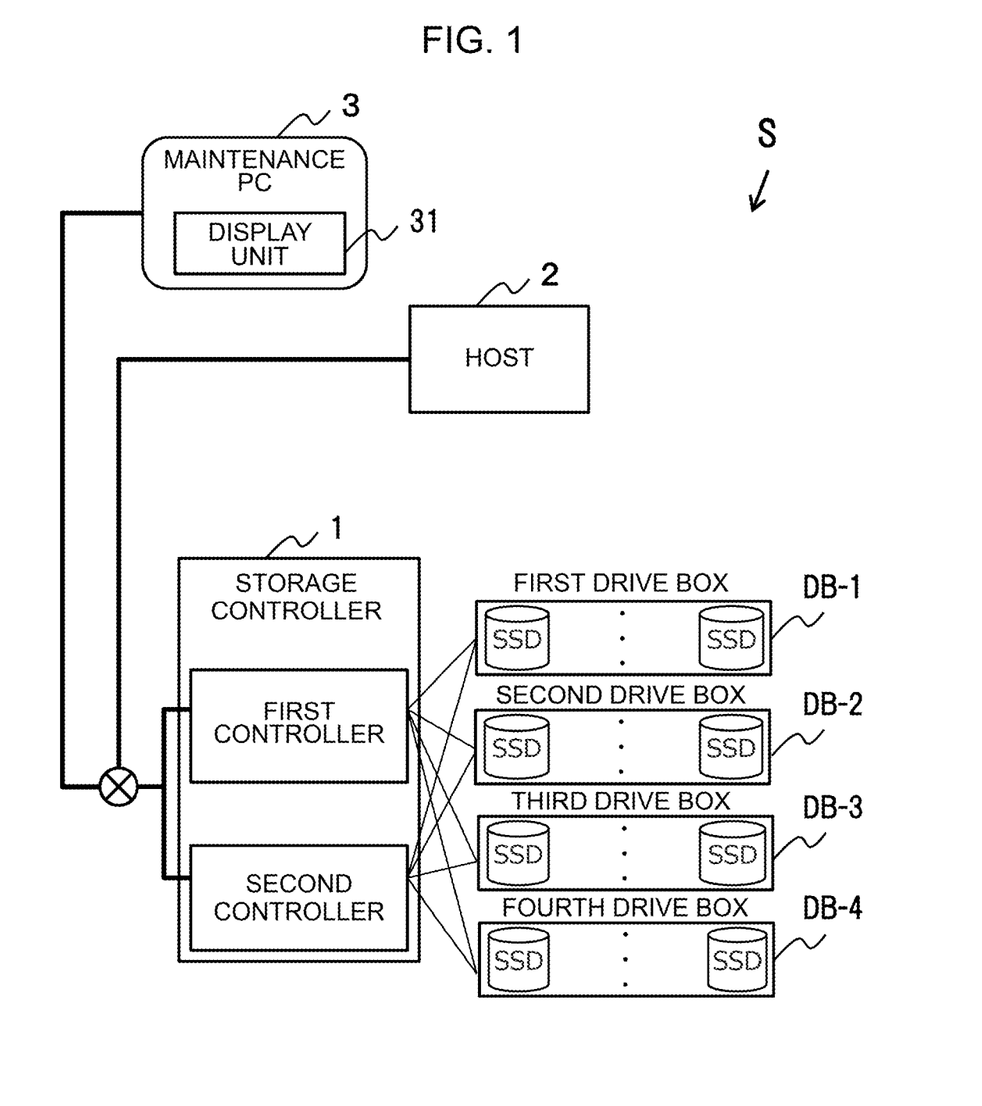
FIG. 1 is a configuration diagram of a storage system.

FIG. 1 is a diagram illustrating a storage system S. The storage system S includes a storage controller 1, a host 2, and a maintenance PC 3. The storage controller 1 is connected to the host 2 and the maintenance PC 3. The storage controller 1 controls a large number of drives and provides storage resources to the host 2.

The storage controller 1 includes a first controller and a second controller. The first controller and the second controller have the same function and it can be said that the storage controller 1 has a redundancy configuration. Each of the first controller and the second controller is connected to all of a first drive box DB-1, a second drive box DB-2, a third drive box DB-3, and a fourth drive box DB-4. Each of the drive boxes communicates with the host 2 and the maintenance PC 3 via the storage controller 1. Since the first drive box DB-1, the second drive box DB-2, the third drive box DB-3, and the fourth drive box DB-4 have the same configuration, the configuration of the first drive box DB-1 will be explained below.

The maintenance PC 3 is a general purpose computer. The maintenance PC 3 includes a display unit 31 that presents information via videos to an operator. If a problem occurs, the first drive box DB-1 outputs information of the problem to the display unit 31 for the maintenance PC 3. The display unit 31 is, for example, a liquid crystal display.

Figure 2:
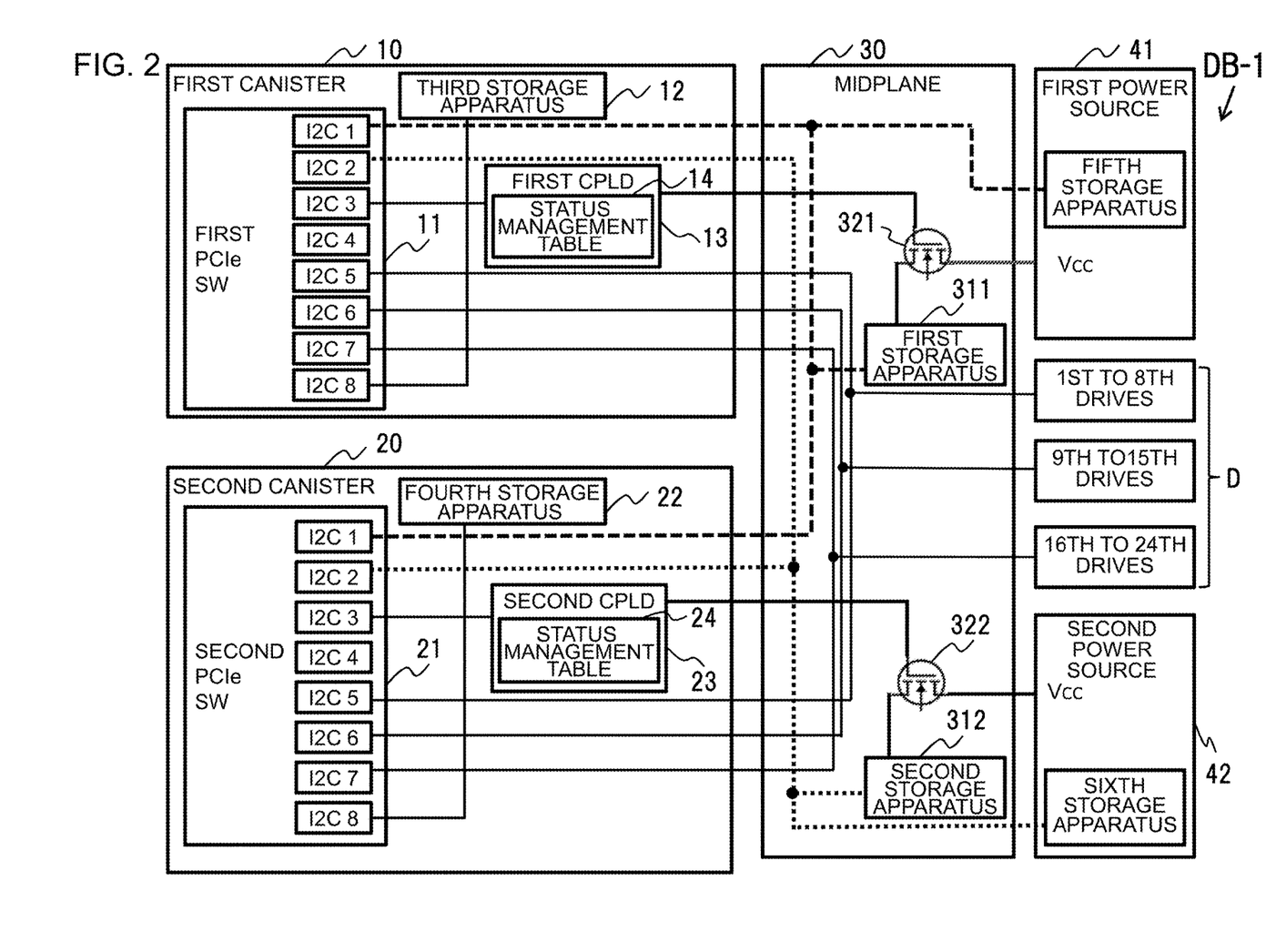
FIG. 2 is a configuration diagram of a first drive box.

FIG. 2 is a configuration diagram of the first drive box DB-1. However, FIG. 2 does not show channels which exist inside the first drive box DB-1 and through which data sent and received between the host 2 and the drives D flows. In other words, FIG. 2 does not show the channels between each controller and the drives D where high-speed, large-capacity communication is performed. FIG. 2 mainly illustrates signal lines relating to VPD (Vital Product Data) for management.

The first drive box DB-1 includes a first canister 10, a second canister 20, a midplane 30, a first power source 41, and a second power source 42. The first canister 10 and the second canister 20 have the same configuration. The first power source 41 and the second power source 42 have the same configuration.

The first canister 10 and the second canister 20 transmit various commands to the drives D in accordance with operating commands from the host 2. The first power source 41 and the second power source 42 supply electric power to the first canister 10, the second canister 20, and the midplane 30. The midplane 30 provides the first canister 10 and the second canister 20 with a connection interface for the drives D. Specifically speaking, the controllers and the power sources have the redundancy configuration, but the midplane 30 does not have the redundancy configuration and becomes a single point of failure.

The first canister 10, the second canister 20, the midplane 30, the first power source 41, the second power source 42, and each drive D have storing apparatuses. Each storing apparatus stores VPD which is important data used for the management. Each storing apparatus performs communication by using I2C (Inter-Integrated Circuit) which is a serial communication standard.

The first canister 10 includes a first PCIe SW 11 which is a switching device compatible with PCI Express, a third storing apparatus 12, and a first CPLD 13. The first PCIe SW 11 is connected to the drives D through communication paths which are not illustrated in the drawing. The first PCIe SW 11 is equipped with a plurality of (for example, eight) I2C communication ports and reads the VPD from the storing apparatus of each apparatus via the I2C communication. Specifically speaking, the first PCIe SW 11 reads VPD of the first canister 10 from the third storing apparatus 12, reads VPD of the midplane 30 from a first storing apparatus 311, and reads VPD of the first power source 41 from a fifth storing apparatus 411. Furthermore, although the details are omitted in FIG. 2, the first PCIe SW 11 also reads VPD from each of the drives D. Furthermore, the first PCIe SW 11 performs the I2C communication with the first CPLD 13 as described later.

The second canister 20 includes a second PCIe SW 21 which is a switching device compatible with PCI Express, a fourth storing apparatus 22, and a second CPLD 23. The second PCIe SW 21 is connected to the drives D through communication paths which are not illustrated in the drawing. The second PCIe SW 21 is equipped with a plurality of (for example, eight) I2C communication ports and reads VPD from the storing apparatus of each apparatus via the I2C communication. Specifically speaking, the second PCIe SW 21 reads VPD of the second canister 20 from the fourth storing apparatus 22, reads VPD of the midplane 30 from a second storing apparatus 312, and reads VPD of the second power source 42 from a sixth storing apparatus 421. Furthermore, although the details are omitted in FIG. 2, the second PCIe SW 21 also read VPD from each of the drives D. Furthermore, the second PCIe SW 21 performs the I2C communication with the second CPLD 23 as described later.

The first CPLD 13 and the second CPLD 23 are arithmetic operation apparatuses capable of inputting and outputting signals. The first CPLD 13 and the second CPLD 23 are described as CPLDs (Complex Programmable Logic Devices) as one example, but it is only necessary for them to be capable of inputting and outputting arithmetic operations and signals and, therefore, they may be rewritable logical circuits of other types and may include a processor which reads and executes programs as necessary. The first CPLD 13 and the second CPLD 23 assist operations of the first PCIe SW 11 and the second PCIe SW 21, so that they can be also called "auxiliary apparatuses." The first CPLD 13 has a status management table 14 described later for managing the first storing apparatus 311. The second CPLD 23 has a status management table 24 described later for managing the second storing apparatus 312.

The midplane 30 includes: the first storing apparatus 311 and the second storing apparatus 312 which store information about the midplane 30; a first MOS switch 321 which controls power supply to the first storing apparatus 311; and a second MOS switch 322 which controls power supply to the second storing apparatus 312. The information about the midplane 30 is stored in the first storing apparatus 311 and the second storing apparatus 312. The first storing apparatus 311 and the second storing apparatus 312 are relatively simple devices compatible with the I2C which is the communication standard and do not have a reset switch.

The first MOS switch 321 is a MOSFET (Metal Oxide Semiconductor Field Effect Transistor) which controls the power supply to the first storing apparatus 311. The first MOS switch 321 may be either a P type or an N type. The first MOS switch 321 controls the power supply from the first power source 41 to the first storing apparatus 311 in accordance with an operating command from the first CPLD 13. The first MOS switch 321 interrupts the power supply to the first storing apparatus 311 and then resumes the power supply, thereby being capable of forcedly resetting the first storing apparatus 311.

The second MOS switch 322 is an MOSFET which controls the power supply to the second storing apparatus 312. The second MOS switch 322 may be either a P type or an N type. The second MOS switch 322 controls the power supply from the second power source 42 to the second storing apparatus 312 in accordance with an operating command from the second CPLD 23. The second MOS switch 322 interrupts the power supply to the second storing apparatus 312 and then resumes the power supply, thereby being capable of forcedly resetting the second storing apparatus 312.

The configurations and operations of the first canister 10 and the second canister 20 are substantially the same. Also, the operations of the first CPLD 13 and the first MOS switch 321 and the operations of the second CPLD 23 and the second MOS switch 322 are substantially the same. Therefore, the operations of the first CPLD 13 and the first MOS switch 321 will be mainly explained below.

Figure 3:
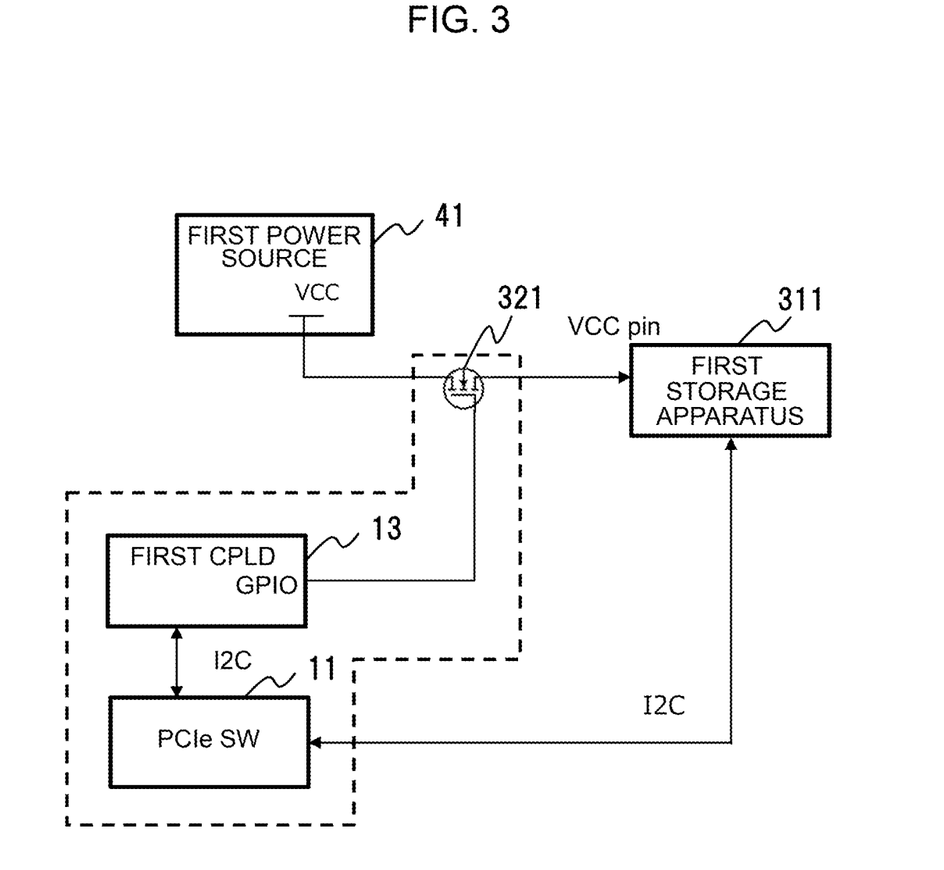
FIG. 3 is a connection diagram mainly focused on a first MOS switch.

FIG. 3 is a connection diagram mainly focused on the first MOS switch 321. The range surrounded with a broken line in FIG. 3 is configured from a hardware circuit. A gate terminal of the first MOS switch 321 and a GPIO terminal of the first CPLD 13 are connected and the first CPLD 13 outputs an operating command(s) to the first MOS switch 321 as described later. A wiring which extends from the first MOS switch 321 to the first storing apparatus 311 is connected to a power terminal (VCC pin) of the first storing apparatus 311. When the power supply from the first power source 41 via the first MOS switch 321 is blocked, the first storing apparatus 311 cannot obtain necessary electric power to operate and is thereby forced to enter a power off state.

The first PCIe SW 11 performs the I2C communication with the first storing apparatus 311 and the first CPLD 13. The first CPLD 13 performs the I2C communication with the first PCIe SW 11 and outputs the operating command(s) to the first MOS switch 321 via the GPIO terminal. Incidentally, it is called GPIO here for the sake of convenience, but it is not a mandatory configuration of the first CPLD 13 to include a general-purpose terminal and the first CPLD 13 may only have to include a voltage output terminal or a current output terminal which is capable of causing the first MOS switch 321 to operate.

Figure 4:
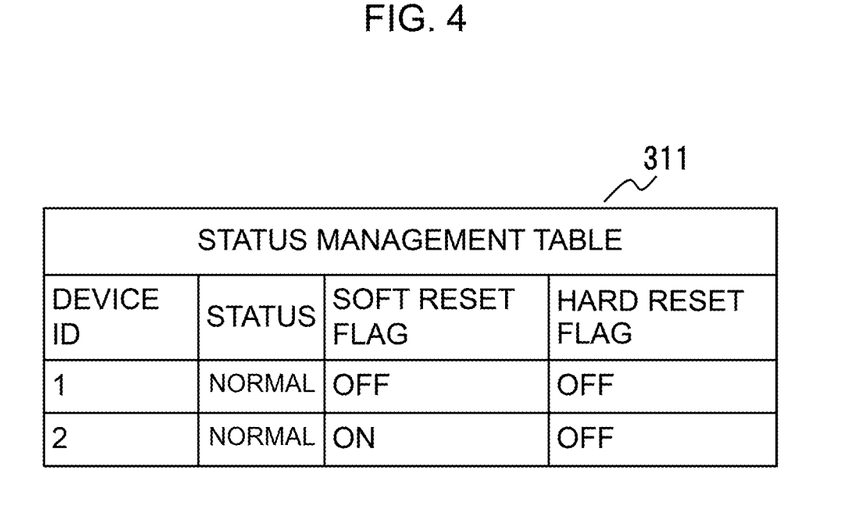
FIG. 4 is a diagram illustrating one example of a status management table.

FIG. 4 is a diagram illustrating one example of the status management table 14, 24. FIG. 4 shows two records for the sake of convenience, but the status management table 14 stored in the first CPLD 13 may have records about the first storing apparatus 311 and the status management table 24 stored in the second CPLD 23 may include records about the second storing apparatus 312.

Each record of the status management table has fields of a device ID 161, a status 162, a soft reset flag 163, and a hard reset flag 164. The device ID 161 is an identifier for identifying the relevant storing apparatus. The status 162 is information indicating whether it is normal or not. The soft reset flag 163 is information indicating whether the soft reset is required or not. The hard reset flag 164 is information indicating whether the hard reset is required or not.

Figure 5:
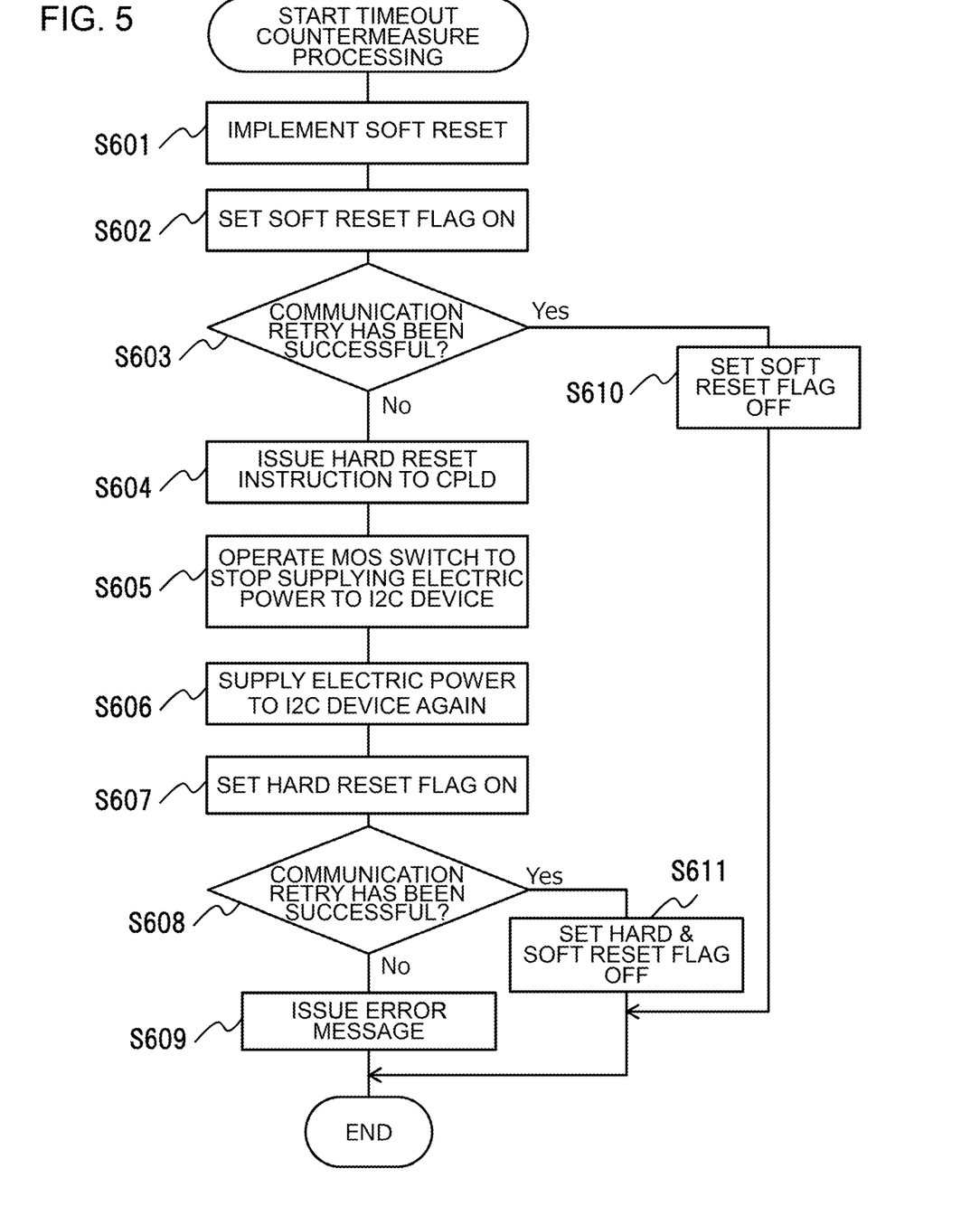
FIG. 5 is a flowchart illustrating timeout countermeasure processing executed by a first canister.

FIG. 5 is a flowchart illustrating timeout countermeasure processing executed by the first canister 10. When the timeout of the I2C communication with the first storing apparatus 311 occurs, the first PCIe SW 11 and the first CPLD 13 execute the timeout countermeasure processing illustrated in FIG. 5. Incidentally, when the timeout of the 120 communication with the second storing apparatus 312 occurs, the second canister 10 also executes similar processing.

In the timeout countermeasure processing, firstly in step S601, the first PCIe SW 11 performs the soft reset of the first storing apparatus 311. This soft reset is performed by, for example, transmitting a predetermined signal. In the next step S602, the first CPLD 13 sets the soft reset flag to ON in the status management table 14. In the next step S603, the first PCIe SW 11 judges whether a communication retry has been successful or not. If the first PCIe SW 11 determines that the communication retry has not been successful, it proceeds to step S604; and if the first PCIe SW 11 determines that the communication retry has been successful, it proceeds to step S610.

In step S604, the first PCIe SW 11 issues an instruction to the first CPLD 13 to perform the hard reset. In the next step S605, the first CPLD 13 operates the first MOS switch 321 and stops the power supply to an I2C device, that is, the first storing apparatus 311. In the subsequent step S606, the first CPLD 13 operates the first MOS switch 321 and resumes the power supply to the 120 device, that is, the first storing apparatus 311. Incidentally, appropriate standby time is set between step S605 and step S606 according to characteristics of the first storing apparatus 311.

In the next step S607, the first CPLD 13 sets the hard reset flag to ON. In the subsequent step S608, the first PCIe SW 11 judges whether the communication retry has been successful or not. If the first PCIe SW 11 determines that the communication retry has not been successful, it proceeds to step S609; and if the first PCIe SW 11 determines that the communication retry has been successful, it proceeds to step S611. In step S609, the first PCIe SW 11: issues an error message to the maintenance PC 3 to inform it that the problem has occurred at the first storing apparatus 311; and terminates the processing illustrated in FIG. 5. This error message is output to the display unit 31 for the maintenance PC 3.

In step S610 which is executed if an affirmative judgment is obtained in step S603, the first CPLD 13 sets the soft reset flag to OFF and terminates the processing illustrated in FIG. 5. In step S611 executed if an affirmative judgment is obtained in step S608, the first CPLD 13 sets the soft reset flag and the hard reset flag to OFF and terminates the processing illustrated in FIG. 5.

The following operational advantages can be obtained according to the aforementioned first embodiment.
(1) The storage system S includes: the first power source 41; the drive boxes to store the drives D which are storage apparatuses; the first storing apparatus 311 having the storage unit in which data regarding the devices are stored; the first PCIe SW 11 which can switch between the plurality of communication paths, has a communication path connected at least to the drives D, and can further perform I2C communication with the first storing apparatus 311; the first CPLD 13 which can perform the I2C communication with the first PCIe SW 11; and the first MOS switch 321 which controls the power supply from the first power source 41 to the first storing apparatus 311. When the timeout of the I2C communication between the first PCIe SW 11 and the first storing apparatus 311 occurs, the first PCIe SW 11 transmits the hard reset command to the first CPLD 13. When the first CPLD 13 receives the hard reset command, the first PCIe SW 11 stops the power supply to the first storing apparatus 311 by using the first MOS switch 321. Therefore, it becomes possible to perform the hard reset of the 120 device which does not have the reset switch.
(2) The storage system S includes the midplane 30 which connects the first power source 41, the drive boxes, and the first PCIe SW 11. The first storing apparatus 311 stores information about the midplane. It is difficult to make the midplane 30 redundant due to its hardware configuration and the midplane 30 becomes a single point of failure. When the I2C communication with the first storing apparatus 311 which stores the information of the midplane is enabled, the hard reset can be further tried according to this embodiment even if the soft reset has failed to recover the communication.
(3) The first MOS switch 321 is placed in the midplane. The first MOS switch 321 which controls the power supply to the first storing apparatus 311 can be located at various positions. However, the first MOS switch 321 and the first storing apparatus 311 are placed in the same midplane 30 as illustrated in this embodiment, it is easy to implement them.
(4) The first CPLD 13 is a CPLD. Therefore, it is easy to implement it.
(5) If the timeout of the I2C communication between the first PCIe SW 11 and the first storing apparatus 311 occurs, the first PCIe SW 11 firstly transmits the soft reset command to the first storing apparatus 311. If the timeout of the I2C communication between the first PCIe SW 11 and the first storing apparatus 311 occurs after the transmission of the soft reset command, the first PCIe SW 11 transmits the hard reset command to the first CPLD 13. Therefore, the hard reset can be performed when the soft reset has failed to recover the communication.
(6) The storage system S includes the display unit 31 that presents information to the operator. If the timeout of the I2C communication between the first PCIe SW 11 and the first storing apparatus 311 occurs after the first CPLD 13 performs the power resupply, the storage system S reports the failure in the communication with the first storing apparatus 311 by using the display unit 31.

(Variation 1)

In the aforementioned first embodiment, the first MOS switch 321 and the second MOS switch 322 are provided in the midplane 30. However, the first MOS switch 321 and the second MOS switch 322 may be provided in the controller or the power source. Specifically, the first MOS switch 321 may be provided in the first power source 41 or the first canister 10. Furthermore, the second MOS switch 322 may be provided in the second power source 42 or the second canister 20.

(Variation 2)

In the aforementioned first embodiment, the first MOS switch 321 which is MOSFET is used to control the power supply to the first storing apparatus 311. However, it is only necessary to be capable of controlling the power supply in accordance with external commands and hardware other than the MOSFET may be used.

(Variation 3)

In the aforementioned embodiment, the first PCIe SW 11 executes the hard reset after trying the soft reset. However, the first PCIe SW 11 may execute the hard reset without trying the soft reset. In this case, the timeout countermeasure processing in FIG. 5 is started from step S604.

(Variation 4)

The maintenance PC 3 may include a voice output unit, such as a speaker, that presents information via voices to the operator instead of the display unit 31. Specifically speaking, the maintenance PC 3 may include a means for reporting the information to the operator.

In each of the aforementioned embodiments and variations, the configuration of functional blocks is just an example. Some functional configurations which are indicated as separate functional blocks may be configured integrally or the configuration expressed as one functional block diagram may be divided into two or more functions. Moreover, part of the function of each functional block may be formed as a configuration possessed by another functional block.

The respective embodiments and variations described above may be combined with each other. The various embodiments and variations have been described above, but the present invention is not limited to the content of these embodiments and variations. Other aspects which can be thought of within the scope of the technical idea of the present invention are also included in the scope of the present invention.

REFERENCE SIGNS LIST

1: storage controller
2: host
10: first canister
11: first PCIe SW
12: third storing apparatus
13: first CPLD
14: status management table
30: midplane
31: display unit
41: first power source
311: first storing apparatus
321: first MOS switch

The invention claimed is:

1. A storage system comprising:
a power source;
a drive box that stores a storage apparatus;
a storing apparatus having a storage unit in which data regarding devices is stored;
a PCIe switch that can switch between a plurality of communication paths, has a communication path connected at least to the storage apparatus, and can further perform I2C communication with the storing apparatus;
an auxiliary apparatus that can perform I2C communication with the PCIe switch; and
a MOS switch that controls power supply from the power source to the storing apparatus,
wherein, if timeout of the I2C communication between the PCIe switch and the storing apparatus occurs, the PCIe switch transmits a hard reset command to the auxiliary apparatus,
wherein, when the auxiliary apparatus receives the hard reset command, the auxiliary apparatus stops the power supply to the storing apparatus by using the MOS switch and then performs power resupply, and
wherein the power source and the auxiliary apparatus are directly connected to the MOS switch.

2. The storage system according to claim 1,
further comprising a midplane that connects the power source, the drive box, and the PCIe switch,
wherein the storing apparatus stores information about the midplane.

3. The storage system according to claim 2,
wherein the MOS switch is placed in the midplane.

4. The storage system according to claim 1,
wherein the auxiliary apparatus is a Complex Programmable Logic Device (CPLD).

5. The storage system according to claim 1,
wherein if the timeout of the I2C communication between the PCIe switch and the storing apparatus occurs, the PCIe switch firstly transmits a soft reset command to the storing apparatus; and
wherein if the timeout of the I2C communication between the PCIe switch and the storing apparatus occurs after the transmission of the soft reset command, the PCIe switch transmits the hard reset command to the auxiliary apparatus.

6. The storage system according to claim 1,
further comprising a reporting unit that presents information to an operator,
wherein if the timeout of the I2C communication between the PCIe switch and the storing apparatus occurs even after the auxiliary apparatus performs the power resupply, the storage system reports a failure in communication with the storing apparatus by using the reporting unit.

7. The storage system according to claim 2, wherein the storage apparatus is placed in the midplane.

* * * * *